US011494989B2

(12) United States Patent
Dehais et al.

(10) Patent No.: US 11,494,989 B2
(45) Date of Patent: Nov. 8, 2022

(54) METHOD ALLOWING AN INDIVIDUAL TO REALISTICALLY TRY ON A PAIR OF SPECTACLES VIRTUALLY

(71) Applicant: Fittingbox, Labege (FR)

(72) Inventors: Christophe Dehais, Toulouse (FR); Ariel Choukroun, Toulouse (FR)

(73) Assignee: Fittingbox

( * ) Notice: Subject to any disclaimer, the term of this patent is extended or adjusted under 35 U.S.C. 154(b) by 0 days.

(21) Appl. No.: 16/617,362

(22) PCT Filed: May 30, 2018

(86) PCT No.: PCT/EP2018/064291
§ 371 (c)(1),
(2) Date: Nov. 26, 2019

(87) PCT Pub. No.: WO2018/234004
PCT Pub. Date: Dec. 27, 2018

(65) Prior Publication Data
US 2021/0142566 A1    May 13, 2021

(30) Foreign Application Priority Data
May 30, 2017  (FR) ...................................... 1754751

(51) Int. Cl.
*G06T 19/00*     (2011.01)
*G06F 3/01*      (2006.01)
(Continued)

(52) U.S. Cl.
CPC ............ *G06T 19/006* (2013.01); *G06F 3/011* (2013.01); *G06T 15/20* (2013.01); *G06T 19/20* (2013.01)

(58) Field of Classification Search
None
See application file for complete search history.

(56) References Cited

U.S. PATENT DOCUMENTS 3,617,114 A  *  11/1971  Rogers ..................... G02C 7/12
                                                         351/49
4,846,913 A  *   7/1989  Frieder .................... G02C 7/06
                                                         156/242
(Continued)

FOREIGN PATENT DOCUMENTS

FR       2900261       10/2007
FR       2955409        7/2011
(Continued)

OTHER PUBLICATIONS

Atchison, Spectacle lens design: a review, Applied Optics vol. 31 No. Jul. 19, 1992, p. 3579-3585 (Year: 1992).*
(Continued)

*Primary Examiner* — Yingchun He
(74) *Attorney, Agent, or Firm* — Perman & Green, LLP

(57) ABSTRACT

A method for generating a final image of an individual from an initial image of the individual acquired by a camera, the image being a still or contained in a video stream. The method includes detecting the face of the individual in the initial image, realistic positioning of a virtual frame on the face of the individual, generating an overlay that is superimposed on the initial image, the overlay comprising a projection of all or a portion of the virtual frame, generating the final image by merging the overlay with the initial image. The frame includes at least one ophthalmic lens characterized by an optical correction and/or an optical treatment. The method also includes, before the final step, a step of calculating the rendering of the ophthalmic lens according to the refraction of the ophthalmic lens and of a depth map of the initial image.

17 Claims, 6 Drawing Sheets

(51) Int. Cl.
*G06T 15/20* (2011.01)
*G06T 19/20* (2011.01)

(56) References Cited

U.S. PATENT DOCUMENTS

| | | | |
|---|---|---|---|
| 6,142,628 | A | 11/2000 | Saigo |
| 9,262,695 | B2 | 2/2016 | Choukroun et al. |
| 2003/0123026 | A1 | 7/2003 | Abitbol et al. |
| 2003/0156125 | A1 | 8/2003 | Welk et al. |
| 2010/0259717 | A1* | 10/2010 | Fermigier ............... G02B 3/08 351/57 |
| 2011/0117293 | A1* | 5/2011 | Durandeau ......... C03C 17/3441 427/559 |
| 2012/0071239 | A1* | 3/2012 | Graepel ............. G06K 9/00355 463/31 |
| 2012/0192088 | A1* | 7/2012 | Sauriol ................... G06F 3/011 715/757 |
| 2012/0313955 | A1* | 12/2012 | Choukroun ........... G06T 19/006 345/582 |
| 2013/0321412 | A1 | 12/2013 | Coon et al. |
| 2016/0232712 | A1 | 8/2016 | Choukroun |
| 2016/0246078 | A1 | 8/2016 | Choukroun et al. |
| 2016/0275720 | A1 | 9/2016 | Dehais et al. |
| 2016/0314610 | A1* | 10/2016 | Lee ....................... G06T 15/005 |
| 2017/0109931 | A1* | 4/2017 | Knorr ....................... G06T 7/11 |

FOREIGN PATENT DOCUMENTS

| | | |
|---|---|---|
| FR | 2971873 | 8/2012 |
| WO | 2013139814 | 9/2013 |
| WO | 2015044309 | 4/2015 |

OTHER PUBLICATIONS

Jocelyn, Wearing Clear Glasses Can Make You Different, downloaded @ https://web.archive.org/web/20140502235424/http://www.theeyecareblog.com/wearing-clear-glasses-can-make-you-different.html, screenshot on May 2, 2014 (Year: 2014).*

Difei et al.; "Making 3D Eyeglasses Try-On Practical", 2013 IEEE International Conference on Multimedia and EXPO, IEEE, Jul. 14, 2014; pp. 1-6.

Yuan et al.; "Magic Glasses: From 2D to 3D", IEEE Transactions on Circuits and Systems for Video Technology, vol. 27, No. 4, Apr. 1, 2017.

International Search Report dated Jul. 19, 2018; International Application No. PCT/EP2018/064291.

* cited by examiner

METHOD ALLOWING AN INDIVIDUAL TO REALISTICALLY TRY ON A PAIR OF SPECTACLES VIRTUALLY

CROSS-REFERENCE TO RELATED APPLICATIONS

This Application is a National Stage of International Application No. PCT/EP2018/064291, having an International Filing Date of 30 May 2018, which designated the United States of America, and which International Application was published under PCT Article 21(2) as WO Publication No. 2018/234004 A1, which claims priority from and the benefit of French Patent Application No. 1754751, filed on 30 May 2017, the disclosures of which are incorporated herein by reference in their entireties.

BACKGROUND

1. Field

The field of the present description is that of augmented reality.

More precisely, the present description relates to a method allowing an individual to realistically try on a pair of spectacles virtually.

The present description has in particular applications in the field of the sale of optical equipment to assist individuals in their choice of a frame and treatments associated with the lenses assembled in the frame.

2. Brief Description of Related Developments

The final aspect of a worn eyeglass frame is particularly influenced by the appearance of the lenses, in terms of their relative volume and through their position in front of the eyes. From the point of view of an observer, they can change the appearance of the eyes of the wearer, and even hide them completely. Some treatments seek to accentuate the reflections of the lighting environment (lens with sun protection, in particular so-called mirror lenses), while others aim to attenuate them as much as possible in order to improve the visual comfort and or the aesthetics.

Virtual techniques for try-on a pair of spectacles by an individual are known from prior art.

For example, such a technique is described in the French patent published under number FR 2 900 261. This technique seeks to propose a virtual try-on of a pair of spectacles that is realistic for the individual, in particular by adding optical effects via an overlay that is superimposed on the lenses of the virtual pair of spectacles.

Thus, such a technique does not make it possible to assist an individual in choosing precisely the optical treatment or treatments that apply on the lenses because the optical effects that can be added are limited in particular to reflections or to the colour of the lenses.

None of the current systems makes it possible to respond simultaneously to all of the required needs, namely to propose a technique that makes it possible to obtain a realistic rendering of the lenses regardless of the optical characteristics chosen by the individual.

SUMMARY

The present description aims to overcome all or a portion of these disadvantages of prior art mentioned hereinabove.

To this effect, the present description relates to a method for generating a final image of an individual from an initial image of the individual acquired by a real camera, the image being a still or contained in a video stream, recorded or in real time, said method comprising steps of:

detecting the face of the individual in the initial image;

realistically positioning a virtual frame on the face of the individual detected in the initial image;

The initial image can for example come from either a real time or recorded video stream, or from a fixed image that represents the face of the individual.

The virtual model, also called avatar, is a three-dimensional model that represents with precision the face of the individual. This model is generally automatically calculated beforehand.

The determining of the real positioning and orientation parameters of the face of the individual in relation to the camera is generally carried out in real time for each image, which corresponds to a following of the face in real time.

It should be underlined that in the final image, the virtual frame is superimposed on the face of the individual detected in the initial image, in a realistic manner, as if the virtual frame was actually being worn by the individual.

According to the present description, the frame comprising at least one ophthalmic lens characterized by an optical correction and/or an optical treatment and the method also comprises steps of:

calculating a representation of the scene perceived from the virtual camera through the ophthalmic lens or lenses according to the refraction of the ophthalmic lens or lenses and of a depth map of the scene;

generating an overlay that is superimposed on the initial image, the overlay comprising a representation of the scene calculated in the step c);

generating the final image by merging the overlay generated in step d) with the initial image.

Thus, an observer who can be the individual himself, can see the face of the individual wearing the virtual frame, as the rendering of the lenses is realistic. The deformations due to the optical corrections of the lenses are thus visible and can be appreciated by the observer.

It should be underlined that the virtual frame is generally a three-dimensional model of a real eyeglass frame, representing its shape, for example by using a triangular meshing, and/or its appearance, for example in the form of texture images.

Furthermore, the depth map of the scene makes it possible to obtain a representation of the scene seen through the ophthalmic lens or lenses in a more realistic manner, because the optical deformation induced by the refraction of the lenses can be calculated in a precise manner when the depth map of the scene is known.

The depth map of the scene can be a depth map of the initial image alone, measured for example by a depth sensor, or combined with a depth map calculated from positioning parameters of an avatar that represents the face of the individual in the virtual space.

It is thus possible to reconstruct a three-dimensional representation of the scene seen by the real camera and consequently to calculate more precisely the optical deformation for example by a method of ray tracing.

Alternatively, the present description relates to a method of generating a final image of an individual from an initial image of the individual acquired by a real camera, the image being a still or contained in a video stream, recorded or in real time, said method comprising steps of:

a') detecting the face of the individual in the initial image;

b') determining real parameters of the positioning and orientation of the face of the individual with respect to the real camera;

c') representing in a virtual space of the face of the individual by a virtual model generated beforehand, the virtual model, called an avatar, being positioned and oriented with respect to a virtual camera thanks to the real parameters determined in the step b'), with the virtual camera representing the real camera in the virtual space;

d') realistic positioning of a virtual frame on the face of the avatar, the frame comprising at least one ophthalmic lens characterized by an optical correction and/or an optical treatment;

e') calculating a representation of the scene perceived from the virtual camera through the ophthalmic lens or lenses according to the refraction of the ophthalmic lens or lenses and of a depth map of the scene;

f') generating an overlay that is superimposed on the initial image, the overlay comprising a representation of the scene calculated in the step e');

g') generating the final image by merging the overlay generated in step f') with the initial image.

In particular aspects of the present description, the realistic positioning of a virtual frame on the face of the individual comprises the following sub-steps:

determining real parameters of the positioning and orientation of the face of the individual with respect to the real camera;

representing in a virtual space of the face of the individual by a virtual model generated beforehand, the virtual model, called an avatar, being positioned and oriented with respect to a virtual camera thanks to the real parameters determined beforehand, with the virtual camera representing the real camera in the virtual space;

realistic positioning of the virtual frame on the face of the avatar.

In these particular aspects of the present description, the depth map combines the initial image with a depth map calculated from positioning parameters of the avatar.

In particular aspects of the present description, the calculating of the representation of the scene also comprises sub-steps of:

calculating the rendering of the reflection of the lenses;

calculating the rendering according to the transparency of the lenses.

In particular aspects of the present description, the overlay also comprises a projection of all or a part of the virtual frame.

In particular aspects of the present description, the ophthalmic lens is represented by a three-dimensional model that has two opposite curved surfaces, spaced and configured according to the optical correction.

In particular aspects of the present description, the lens is represented locally by a prism formed by two flat diopters.

In particular aspects of the present description, the step of calculating the rendering of the ophthalmic lens implements a method of ray tracing and/or a method of rasterization.

In particular aspects of the present description, a map of the background is developed before or at the beginning of the calculating of the rendering of the ophthalmic lens.

In particular aspects of the present description, the map of the background comprises a depth map.

In particular aspects of the present description, the surface of the ophthalmic lens is associated with reflectance and refraction parameters.

In particular aspects of the present description, the material of the ophthalmic lens is associated with at least one absorption coefficient according to the wavelength.

In particular aspects of the present description, the material of the ophthalmic lens is associated with three absorption coefficients according to the translucency of the lens.

It should be underlined that each absorption coefficient can be defined locally for each point of the surface of the lens or globally for the entire surface of the lens.

In particular aspects of the present description, the optical treatment is included in the list:
anti-reflective treatment;
iridescence; and
photochromic treatment.

In particular aspects of the present description, the ophthalmic lens comprises the optical correction adapted to the eyesight of the individual.

In particular aspects of the present description, the form of the three-dimensional model of the lens is representative of the machining associated with the optical correction and of a material used.

In particular aspects of the present description, the method comprises a step of determining the centering parameter of the basic wafer in which the lens is machined.

In particular aspects of the present description, the initial image is an image of an individual who is wearing a real pair of spectacles, with the individual having indicated the optical correction of each lens assembled in said pair of spectacles, the calculation of the refraction that makes it possible to obtain a representation of the scene perceived by the camera through the lenses without optical deformation or with another optical correction.

The present description also relates to a method for augmented reality used by an individual, characterized in that it comprises steps of:

acquiring a video stream of the individual positioned facing a camera and displaying of this video stream on a screen, with the video stream being processed by the method for determining a final image according to any of the preceding methods of implementation, the video stream displaying the individual wearing on their face either a real frame worn by the individual or a virtual frame chosen beforehand;

modification by the individual of one optical characteristic of at least one ophthalmic lens and updating in real time of the representation of the scene through one or several ophthalmic lenses, with the optical characteristic being included in the list:
correction of the sign of the individual;
centering parameters of the correction; and
type of lens used.

The present description also relates to a device comprising a computer processor and a computer memory that stores the instructions of a computer program that implements a method for determining a final image according to any of the preceding methods of implementation.

The present description also relates to a method of manufacturing a lens that implements the steps of the method for generating a final image according to one of the preceding methods of implementation, in which the machining parameters of the wafer used as a basis for the lens are established from the centering parameter determined beforehand.

It should be underlined that the manufacturing corresponding to a real lens in particular comprises a step of machining the wafer used as a basis for the lens.

The method of manufacturing a lens can also be virtual and result in a virtual three-dimensional model of the lens.

In other terms, the method of manufacturing a lens comprises steps of:

acquiring an initial image;

detecting the face of the individual in the initial image;

determining real parameters of the positioning and orientation of the face of the individual with respect to the real camera;

representing in a virtual space of the face of the individual by a virtual model generated beforehand, the virtual model, called an avatar, being positioned and oriented with respect to a virtual camera thanks to the real parameters determined in the step c), with the virtual camera representing the real camera in the virtual space;

realistic positioning of a virtual frame on the face of the avatar, the virtual frame being representative of a real frame;

positioning of a lens in the virtual frame;

determining the centering point of a basic wafer according to the positioning obtained in the step f) and according to the mounting parameters concerning the frame and the individual; determining machining parameters of the basic wafer in order to obtain the lens to be assembled in the real frame.

The mounting parameters concerning the frame and the individual are in particular the interpupillary distance (PD), the mono-pupillary distance (monoPD), the heights, the pantoscopic angle, etc. It should be underlined that these parameters are generally linked to the position of the frame on the face of the individual.

BRIEF DESCRIPTION OF THE DRAWINGS

Other advantages, purposes and particular characteristics of the present description shall appear in the following non-limiting description of at least one particular embodiment of the devices and methods object of the present invention, with regards to the accompanying drawings, wherein.

DETAILED DESCRIPTION

The present description is given in a non-limiting manner, with each characteristic of an embodiment able to be advantageously combined with any other characteristic of any other embodiment.

Note, as of now, that the figures are not to scale.

Example of a Particular Aspect of the Present Description

Figure 1:
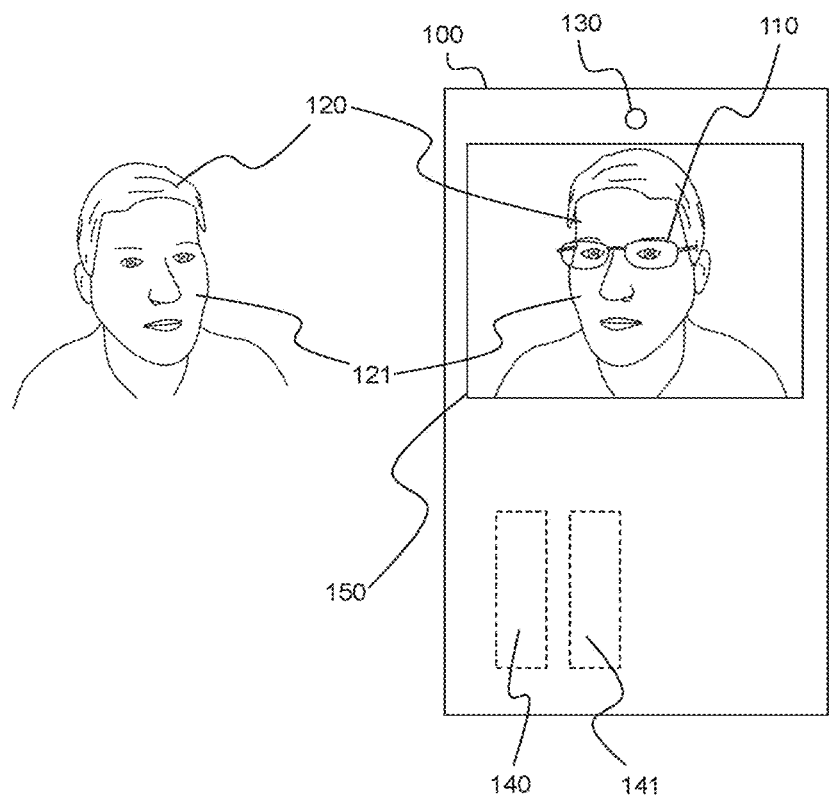
FIG. 1 shows a device for augmented reality that implements the method object of the invention.

FIG. 1 shows a device 100 for augmented reality that allows for the virtual try-on of a pair of spectacles 110 by an individual 120. The device 100 comprises a camera 130 that acquires a stream of images, also called a video stream, that is displayed after processing by a computer processor 140 included in the device 100, on a screen 150 of the device 100. Thus, the individual 120 can see in real time on the screen 150 their face 121 virtually wearing the pair of spectacles 110.

To this effect, the device 100 comprises a computer memory 141 that stores the instructions of a method 200 for generating a final image from an initial image acquired by the camera 130. It should be underlined that the initial image processed by the method 200 for generating a final image is any image whatsoever of the stream of images acquired by the camera 130. The generating of the final image from the initial image is advantageously carried out in real time or quasi-real time so that the individual 120 can see themselves instantaneously on the screen 150, substantially as in a mirror.

Figure 2:
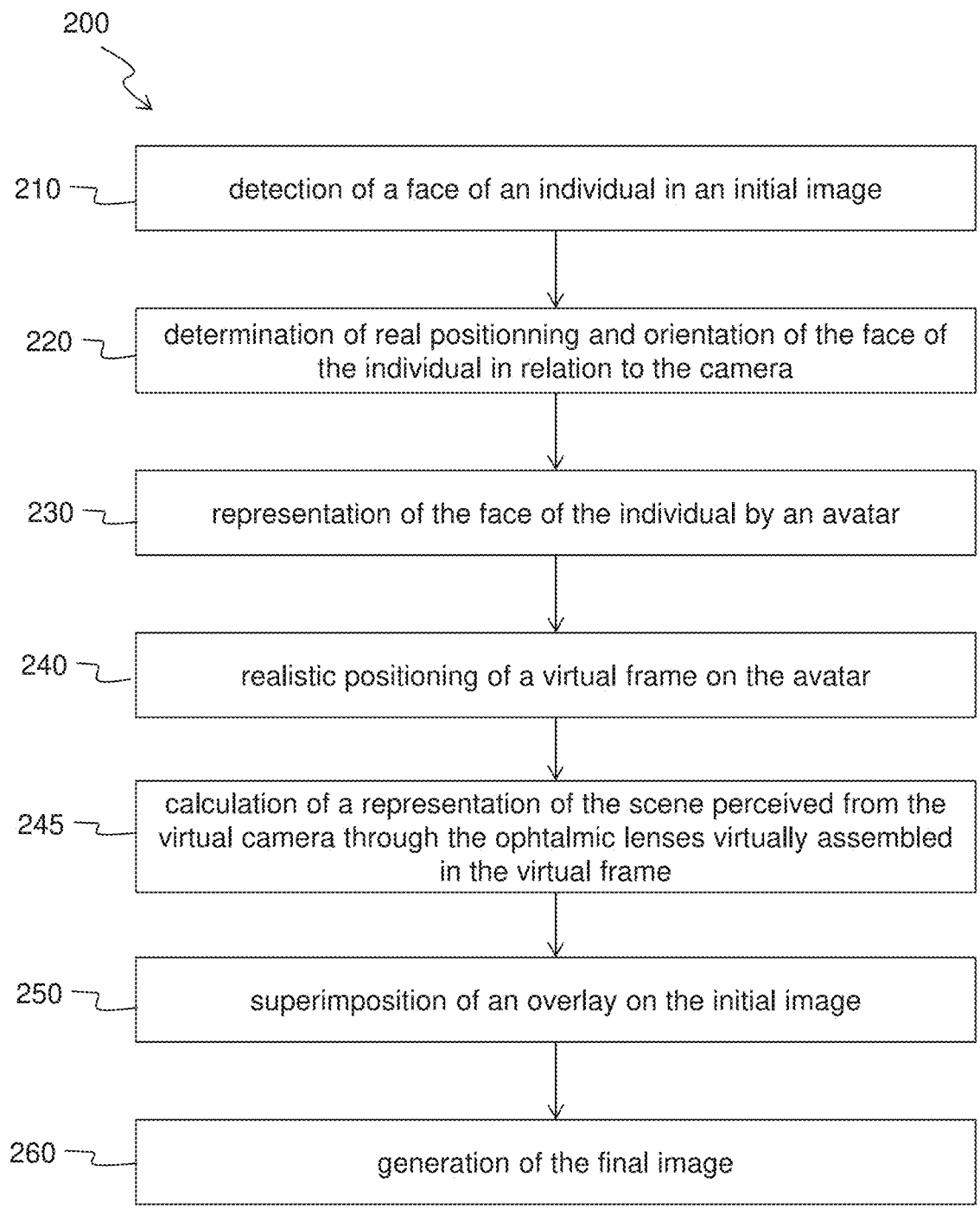
FIG. 2 shows in the form of a block diagram the steps of the method object of the invention.

The method 200 for generating a final image, illustrated in the form of a block diagram in FIG. 2 comprises a first step 210 of detecting the face of the individual in the initial image.

This step 210 of detecting is a conventional step for those skilled in the art and can for example be based on a method for detecting the face and the characteristics of the face commonly referred to as "features" which in particular relies on learning algorithms. Such a technique is for example described in the French patent published under the number FR 2 971 873 and entitles "Method for detecting a predefined set of characteristic points of a face".

The method 200 then comprises a second step 220 of determining real positioning and orientation parameters of the face 121 of the individual 120 in relation to the camera 130.

The determining of the real positioning and orientation parameters makes it possible in particular to position in a virtual space that represents the scene, a virtual model that represents in three dimensions the face 121 of the individual 120 during the third step 230 of representing the face 121 of the individual 120, with this virtual model being referred to as an avatar in the rest of the description. It should be underlined that the avatar does not appear in the final image contrary to virtual reality techniques, and is used only to develop the final image.

After having virtually represented the real face 121 in the virtual space, a three-dimensional virtual frame, selected beforehand by the individual 120 via a graphics interface presented by the device 100, is realistically positioned on the avatar during a fourth step 240 of the method 200. It should be underlined that the virtual frame was developed from a real frame for example via the technique described in the international patent application published under number WO 2013/139814. The virtual frame is generally stored in a database connected to the device 100.

An overlay that is superimposed on the initial image is then developed during a fifth step 250 of the method 200. The overlay comprises a projection of all or a portion of the virtual frame, taking account in particular of the hidden portions and even obstructions.

The final image is then generated during a sixth step 260 by merging the overlay developed in the step 250 with the initial image.

It should be underlined that those skilled in the art seeking to implement the steps 210, 220, 240, 250 and 260 can for example refer to the fascicule of the patent published under number FR 2 955 409 entitles "Method for integrating a virtual object into photographs or video in real time" which gives an example of the implementation of these steps.

According to the present description, the virtual frame comprises in the present non-limiting example of the present description two three-dimensional models of lenses each characterized, in addition to the material and the tint, by an optical correction and/or an optical treatment.

The optical correction of each lens, generally prescribed by an ophthalmologist, even by an optician, is adapted in the present non-limiting example of the present description to the sight of each eye of the individual 120. The optical correction is generally translated by a value in diopter which is positive in the case of a farsightedness or negative in the case of nearsightedness. This can also be a double correction value, used in particular for bifocals or a progressive lens, with one corresponding to near vision and the other to long distance vision. The correction can also comprise a pair of values between parentheses in order to indicate to correct the astigmatism of the individual 120.

The optical correction associated with a lens is in particular used for the machining of the lens to be assembled in the real frame. The machining of the lens is translated on the three-dimensional model in particular by two opposite curved surfaces and configured for the optical correction, with one of the surfaces being positioned, at the time of assembly, outside of the real frame and the other inside the frame. In other terms, the outer surface corresponds to the front face, which the inner surface corresponds to the rear face that is positioned facing the eyes when the frame is worn on the head of the individual. The thickness between the two curved surfaces is also determined according to the desired optical correction, optical properties of the material used for the lenses and of different mechanical stresses such as for example the solidity.

The configuration of the curved surfaces and of the thickness between the two surfaces is taken by the model of each lens, included in the virtual frame that is positioned on the final image.

It should be underlined that the three-dimensional models of lenses can also be stored in the same database as the three-dimensional models of real frames.

The optical treatment associated with a lens is in the present non-limiting example of the present description an anti-reflective treatment applied on the outer surface of the lens.

In alternatives of this particular aspect of the present description, the optical treatment can also be iridescence or a photochromic treatment.

Also, according to the present description, the method 200 also comprises before the step 260 of generating the final image, a step 245 of calculating a representation of the scene perceived from the virtual camera through the ophthalmic lenses virtually assembled in the virtual frame. This calculation is carried out by taking account of the refraction of the ophthalmic lenses, and therefore of the optical correction applied. By also taking account of the reflection and of the various treatments applied to the lenses, this step makes it possible to obtain a realistic rendering of the ophthalmic lenses in order to allow the individual 120 to see their face wearing the virtual pair of spectacles on the screen 150, by simulating the rendering of the lenses. The individual 120 can thus in particular appreciate the optical deformations due to the lenses that they have chosen before the actual assembly thereof in the real frame.

Figure 3:
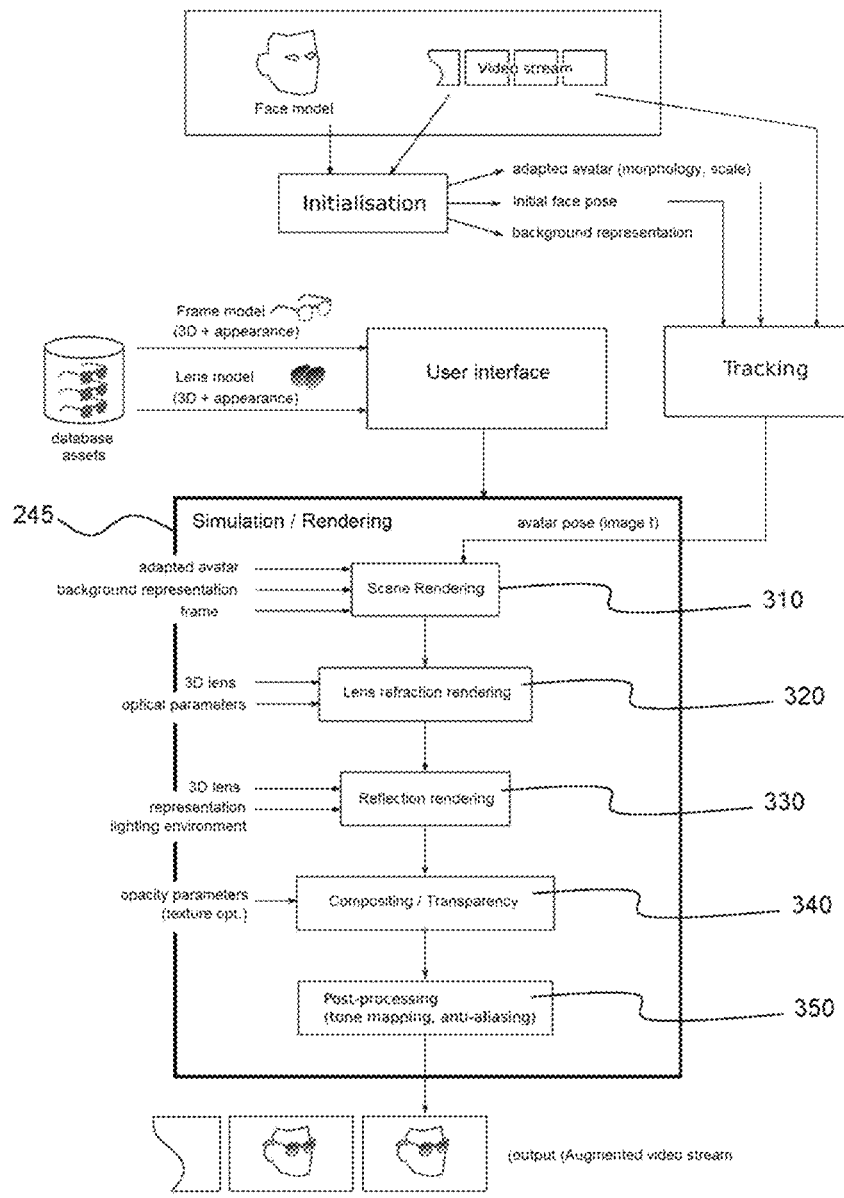
FIG. 3 shows in the form of a block diagram the details of a step of the method shown in FIG. 2.

This step 245, shown in more detail in FIG. 3, is in the present example implemented after the step 240 of positioning the virtual frame and before the projection of the frame on the overlay carried out during the step 250.

To this effect, the step 245 of calculating the rendering comprises a first sub-step 310 of representing the scene comprising the avatar, the virtual frame and a representation of the background of the head of the individual 120.

Each three-dimensional object included in the scene, in particular the avatar or the virtual frame, is represented in the form of a three-dimensional surface that has a triangular meshing. This representation is in particular adapted to real time rendering via rasterization.

A depth map representing the scene is developed during this step sub-step 310 and combines the current image, i.e. the initial image, with a depth map calculated from positioning parameters of the avatar.

It should be underlined that the background corresponds to all of the elements of the real scene except for the face and the frame. The background of the scene is generally complex.

Figure 4:
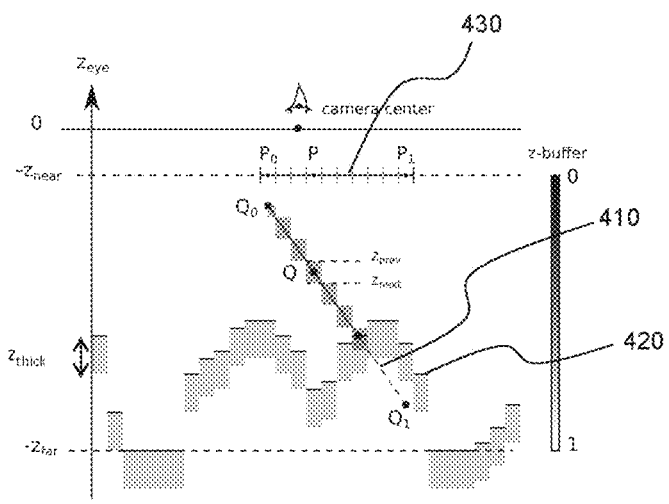
FIG. 4 shows the technique of "ray-tracing" used during a sub-step detailed in FIG. 3.

If the geometry of the background is known precisely, for example thanks to a three-dimensional reconstruction carried out beforehand, then this representation of the background can be integrated into the representation of the scene. A technique for rendering via ray tracing makes it possible to determine the intersection of a ray with the representation of the background such as shown in FIG. 4.

In order to determine the intersection of a ray 410 [Q0, Q1] with the current depth map 420, the projection of the ray 430 [P0, P1] is scanned in the image space and the depth value is compared with the depth interval [$z_{prev}$, $z_{next}$] covered by the ray. Given that the representation by depth map is sparse, the depth value is associated with an arbitrary thickness $z_{thick}$ that is low used to connected neighboring depth intervals.

In alternatives of this particular aspect of the present description, ray tracing techniques can be used, in particular if the power of the computer processor 140 is sufficient.

In the case where a three-dimensional representation of the environment is not available, an approximate representation is used with the assumption that the background is far from the camera in relation to the camera-lens distance. This approximated representation of the background can be for example:

a plane fronto-parallel to the camera, with this plane being located at a distance chosen according to the distance of the other elements of the scene so that the plane is sufficiently far from these elements, with the image presented by this plane able to be repeated in the plane, for example with inversion so as to limit the discontinuities; or an environment map, i.e. a background positioned to infinity. The intersection with any ray is a point in infinity of which the map gives the color. This point depends only on the direction of the ray. It is therefore sufficient to calculate, according to the configuration chosen for the map (for example a straight cubemap, spherical configuration, etc.), with the coordinates of the pixel corresponding to the direction of the ray; or a combination of these two representations wherein if the intersection of the ray and of the plane is outside of the image then the environment map is used.

The calculating of the rendering carried out during the step 245 then comprises a second sub-step 320 of calculating the rendering of the refraction of the lenses making it possible to simulate the deformation of the appearance of the face, of the portion of the frame visible through the lenses and of the background as they are seen by an observer looking at the lenses. This deformation is simulated by reproducing the path of the light beams coming from the center of the virtual camera and passing through the lens at each point of its front surface, also called the external surface. After refraction on two interfaces of the lens (front and rear face), the light beams represented by rays impact one of the elements of the 3D scene: the background, the face or an element of the frame, for example one of the temples. For the rendering of the deformation through the lenses, the color associated with a ray is that of the surface at the point of impact, also called point of intersection.

It should be underlined that the final geometry of the lens is determined by: on the one hand the machining of the basic wafer, in general a spherical cap; on the other hand the cutting out of this base required for the inclusion of the lens in the frame.

The calculating of the refraction of the lenses combines a rendering via rasterization of the projection of the lenses and a ray tracing technique implemented in a shader, for each pixel covered by the lens.

In order to calculate a realistic rendering, the ray tracing is carried out in two successive phases for each marched ray:

a first phase 321 of calculating parameters of the ray refracted by the lens according to the origin of the ray and the direction thereof. This calculation depends on the geometry of the lens considered;

a second phase 322 of calculating the intersection of the ray refracted with the other elements of the scene in the background of the lens considered: the virtual frame, the representation of the face of the individual 120 and the background of the face.

Figure 5:
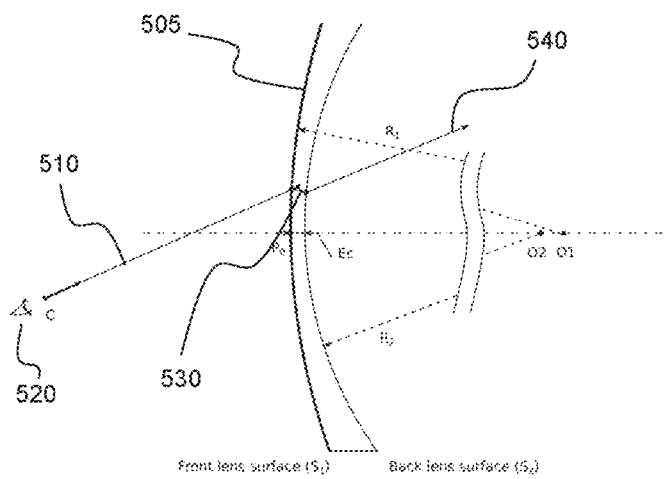
FIG. 5 shows the calculating of rendering through a simple lens.

During the first phase 321, the calculation of the refraction through the lens can be determined easily in the case where the lens has a simple geometry, as is the case for spherical lenses of the meniscus type. In this case, as shown in FIG. 5, the calculating of the ray refracted through the lens 505 is carried out by applying the formulas of the ray-sphere intersection and the Snell-Descartes formula successively for the outer sphere $S_1$ of radius $R_1$ and of optical center $O_1$ and the inner sphere $S_2$ of radius $R_2$ and of optical center $O_2$. Thus, the ray 510 coming from the point of view 520 propagates inside the lens in a ray 530 after having passed through the sphere $S_1$. This ray 530 then exits the lens by passing through the sphere $S_2$ in a ray 540, referred to as the output ray of the lens.

In the case of a more complex lens, such as for example in the case of an aspherical lens, characterized by the fact that it comprises at least one of the non-spherical faces, there is rarely a simple formula for calculating the ray refracted by the lens.

Figure 6:
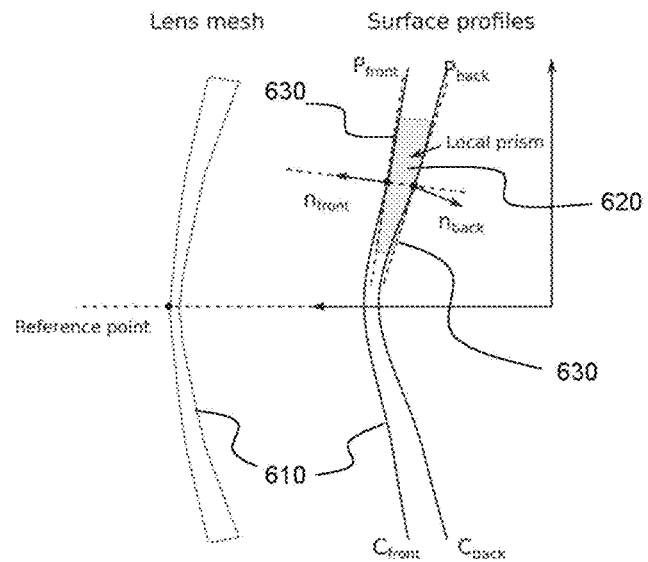
FIG. 6 shows the calculating of rendering through a complex lens.

As shown in FIG. 6, the geometry of the lens 610 is then assimilated with a paving, more preferably infinitely dense, of prisms 620 corresponding to an association of two flat diopters 630. At each point of the surface of the lens, in particular in its representation in the form of meshing, the parameters of the prism 620 formed by the tangent planes 630 are associated with the two interfaces of the simulated geometry. This prism is entirely determined by five parameters: two angles, or two normals, for each one of the two planes 630 and a distance between the two planes 630.

This representation makes it possible to encode the complex shape of the lens in a texture with five components, or in two standard RGB textures. In the case of a lens with radial symmetry, the number of parameters is reduced to three, i.e. with a single angle per tangent plane instead of two. A single RGB texture is then required.

From this information, the shader reconstructs at each fragment the two planes of the local prism and calculates the two rays (internal and output) by using the formula of ray-plane intersection then in a manner similar to the case of spherical lenses.

The cutting out of the lens satisfies the real mounting constraints which guarantees the solidity and the good resistance of the lens. The centering of the lens is required for an optical correction and a vision comfort that are adequate by allowing for the alignment of the optical axis of the lens with the optical axis of the eye.

In the present example the model used for the rasterization of the lenses is a piece of data and does not require a particular geometrical construction because the cutting out is carried out implicitly. The realistic simulation of the finished lens is simply based on a calculation of the centering of the lens, in relation to the virtual frame.

The calculating of the centering depends on the pupil distance of the individual 120, on the measurement of the lens heights on the worn frame and on the pantoscopic angle of the frame. This data is either provided by the individual 120 by the intermediary of a graphics interface, or determined automatically by a method for measuring that is well known to those skilled in the art.

From this representation of the scene, the position and the 3D orientation of the basic form that satisfies the mounting and centering constraints and are automatically determined, as well as the position of the point of reference P0, also called centering point, such as shown in 5 and 6. From this point of reference, the relative positioning of the basic wafer according to its 3D representation is deduced. Thus calculated for example are the position of the axis of revolution of the wafer in the case of FIG. 5 or the local mark wherein the paving of prisms is defined in the case of FIG. 6. The relative positioning of the basic wafer defined by this method can thus be used for the machining of the lens in the basic wafer.

Moreover, an analysis between the thickness of the cut lens at any point of the contour thereof and the thickness of the frame can be carried out in order to report to inform the individual 120 of any possible mounting incompatibility. By taking these thicknesses into account, the individual 120 can also evaluate the aesthetics of the final mounting.

The step 245 of calculating the rendering shown in FIG. 3 then comprises a third step 330 of calculating the rendering of the reflection of the lenses assembled in the virtual frame. The reflectance of the light on the surface of a lens is substantially specular. There is in fact little diffusion inside the material.

In order to calculate the reflectivity of the surface of the lens, a two-directional model is used. The two-directional reflectivity model is a conventional model of the specular microfacets type that follows the Fresnel reflectance. The macroscopic parameters of the model are the specular color, comprising a trichromatic representation of the specular albedo, and the glossiness. It should be underlined that the glossiness influences the distribution function of the normals of the microfacets.

The reflection of the lenses in the present example reduced by an anti-reflective treatment that consists in the application of one or several thin layers that form on the surface of the lens destructive interferences, reducing the amplitude of the resulting reflected light wave. There is a relationship between the thickness of these layers and the range of the attenuated wavelength.

The appearance of these treatments is simulated by using the macroscopic effect thereof: it consists in attenuating the specular reflection coefficient of the lens, i.e. reducing the specular color. It is also possible to modify differently each component of this color, and thus tint the resulting reflections, thus simulating the microscopic origin of the mechanism: indeed the attenuation depends via construction on the wavelength of the incident signal.

The iridescence can also be taken into account during this sub-step. The iridescence or irisation is an optical phenomenon caused by different mechanisms: diffraction, interference between reflections on a microscopic scale, interference via a thin layer. This latter phenomenon is the one used by covering the lenses with a thin layer which produces the desired aesthetic effect. The mechanism is rather similar to the anti-reflective treatment, although here a selective attenuation is sought of certain wavelengths according to the angle of vision.

The modelling of this phenomenon of iridescence on a microscopic scale cannot be considered for rendering in real time, however we can simulate the macroscopic effect of changes in color of the reflections according to the angle of vision by modifying the specular color according to the angle of vision.

Figure 7:
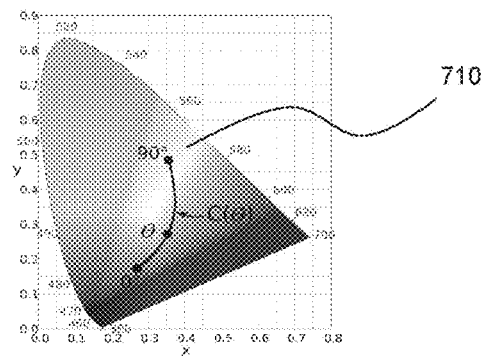
FIG. 7 is an example of a chromaticity curve used during the calculating of the iridescence.

A chromaticity curve $C(\theta)$ is defined which is a curve in the 3D colorimetric space used (defined for example by the three components R, G and B of the color), defining the specular color of the surface according to the angle of vision corresponding to the angle between n the normal of the surface at the point considered and v the unit vector pointing to the center of the camera, also called viewing vector. FIG. 7 shows an example of the projection of the curve $C(\theta)$ in a diagram 710 of 2D chromaticity wherein the luminance is absent.

The curve $C(\theta)$ describes the variation in the specular color at a point of the surface according to the angle of observation of this point. Several methods make it possible to define this curve:

either via a 1D texture image representing a color gradation;

or via a pair of colors $C_n$ (color with normal incidence, theta=0°) and $C_r$ (color with grazing incidence, theta=90°). The color $C(\theta)$ is then given by linear interpolation $C(\theta)=(\theta*Cr+(90-\theta)*Cn)/90$.

After having calculated the reflection of the lenses, the method then calculates the rendering of the lenses according to their transparency during a fourth sub-step 340 of the step 245 of calculating the rendering, so as in particular to simulate opaque lenses such as sun or photochromic lenses.

The transparency is represented by an absorption function between 0 and 1. It describes for each wavelength, the quantity of the light passing through the lens which is absorbed. In the case of virtual try-on applications, the indirect illumination by the face of the individual 120 is primarily considered. The absorption function is given by its trichromatic representation in the form of a color.

The transparency of the lenses is modelled at each point of the surface by three absorption coefficients $(r_R, r_G, r_B)$. For each channel X among RGB, $r_x=0$ means complete transparency for the corresponding color, $r_x=1$ means complete opacity. For the control and the editing, these coefficients can be represented as a color $(c_R, c_G, c_B)$ and an opacity value alpha. $r_x=c_x*alpha$ is then used.

If the absorption varies on the surface of the lens, a texture image is used to encode its value at each point.

The absorption coefficient is used to determine the rendering of each semi-transparent surface according to the image of the elements located behind. The system ensures that the order of display of the surfaces is coherent (from the rear to the front), for example via a technique of "depth peeling", well known to those skilled in the art.

In the case of a photochromic treatment of the lens, which makes it possible to obtain a sun protection that is variable according to the solar exposure received by the lens generally by the intermediary of a thin layer that reacts to ultraviolet rays and which is deposited onto the surface, two states of the lens, transparent and semi-transparent, are determined by two sets of parameters. A transition time, according to the quantity of exposure by the UV light is then defined. In the simulation, this quantity of light can be associated with a type of virtual environment that represents different real situations (time of the day and sunshine condition, different typical indoor conditions, etc.). Each transition from one environment to another corresponds to a transition duration T. This duration can be predetermined or calculated according to the values of the illuminations of the initial and final conditions.

When the individual 120 chooses a transition to a chosen situation, corresponding for example to an indoor/outdoor transition during a day with sunshine, the system measures the passing of time t and calculates the degree of progress in the transition $\mu(t)$ between 0 and 1. $\mu$ is any strictly increasing function that satisfies mu(0)=0 and mu(T)=1. A possible formula is mu(t)=t/T. Each parameter pi describing the state of the lens (for example red channel of the specular color) is interpolated between its initial value and its final value in order to obtain the parameter of the transient state at instant t:

$$pi(t)=mu(t)*pi\_final+*(1-mu(t))*pi\_initial$$

Finally, the calculating 245 of the representation of the scene through the lenses is finalized by a sub-step 350 of post-processing during which "anti-aliasing" and "tone mapping" treatments are applied in order to obtain a realistic rendering without apparent edge or pixel effects.

Figure 8:
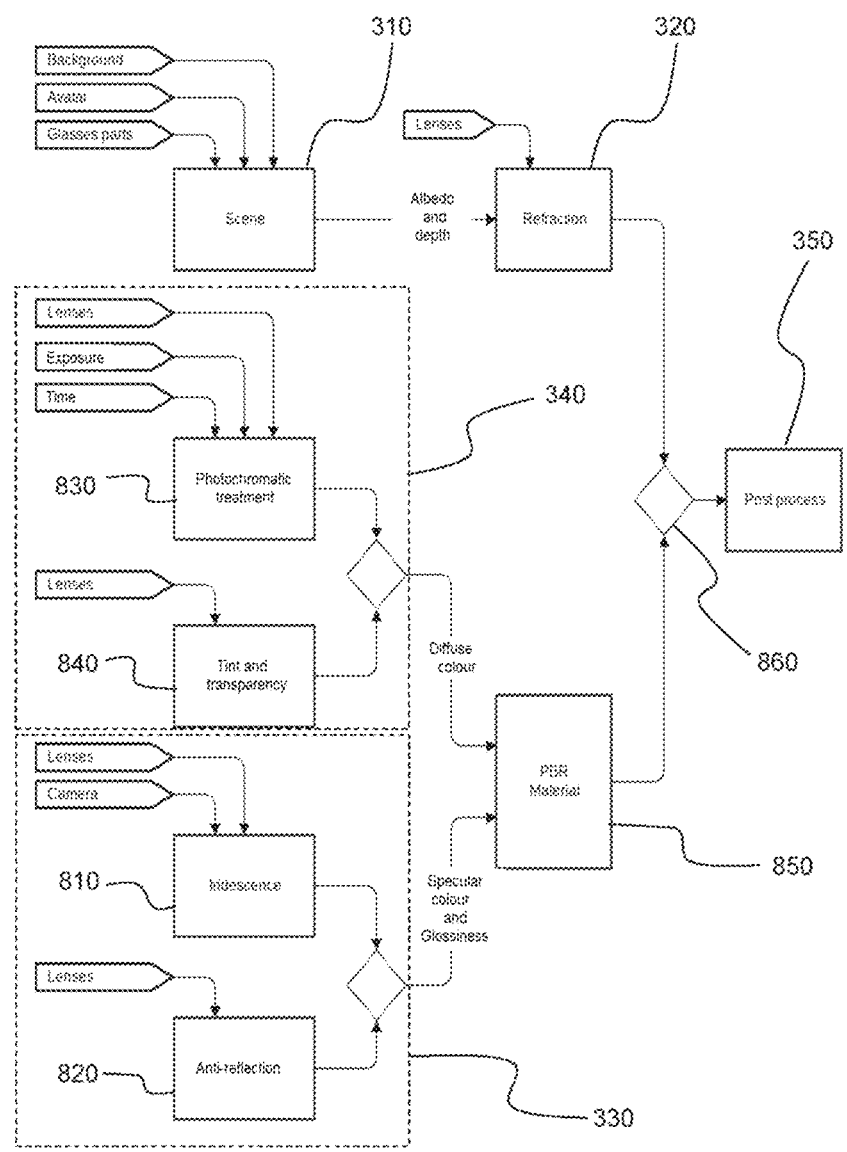
FIG. 8 is another illustration of the implementation of the step of calculating the representation of the scene perceived from the virtual camera through the ophthalmic lens or lenses.

FIG. 8 shows more precisely the implementation of the steps of the calculating 245 of the representation of the scene perceived from the virtual camera.

The scene comprising the background, the avatar and the frame of the pair of spectacles, noted as "glasses parts" is represented in the virtual space in the course of the sub-step 310. This representation makes it possible to obtain at the point of view of the virtual camera an image of the albedo, also called color image, with which a depth map is associated.

The albedo image and the depth map are then used by the calculation 320 of the refraction that results in an image of the scene that is deformed by the lenses.

In parallel, the sub-steps of calculating 330 the reflection and of calculating 340 the transparency are carried out.

The calculating 330 of the reflection comprises the calculating 810 of the iridescence from the lenses and of the position of the virtual camera, and the calculating 820 of the reflections by taking account of any anti-reflective treatment of the lenses. The calculating 330 results in specular color maps and glossiness.

While the calculating 340 of the transparency is based on the calculating 830 of the photochromatic treatment according to the lenses and the quantity of ultraviolet rays received which is relative to the exposure and the time. The calculating 340 is also based on the calculating 840 of the tint and of the transparency which are according to the lenses chosen by the individual 120. By integrating these two effects, the calculating 340 provides a diffuse color map.

The specular color maps, glossiness and diffuse color are then integrated by a rendering engine (shader) during a sub-step 850 in order to obtain an image of the visual effects to be made to the lenses. This image comprises in particular opaque zones and zones that are more or less transparent.

The image of the deformed scene and the image of the visual effects are then merged via an alpha-blending method, well known to those skilled in the art, in the course of the sub-step 860 in order to obtain an image of the representation of the scene through the lenses.

This image of the representation of the scene through the lenses then undergoes a post-treatment carried out during the step 350.

The representation of the scene obtained during the step 245 is then integrated into the overlay that is superimposed on the initial image. A cutting can then be carried out so that the representation is not superimposed or does not exceed the projection of the virtual frame.

Thanks to the method 200 of generating a final image that comprises the steps of rendering the lenses according to the optical characteristics that the individual 120 can advantageously choose in real time via a graphics interface presented by the device 100, the individual 120 can thus see himself on the screen 150 virtually wearing a pair of spectacles that comprises corrective and/or sun lenses. As the rendering of the correction and of the treatments applied is realistic, the individual 120 can then test a substantial number of combinations of frames, lenses and treatments to be applied on the lenses and then choose the one that best corresponds to them.

A visualization of the assembly of the machined lens with the virtual frame can also be carried out in order to verify the compatibility of the lens chosen with the frame chosen, before machining the wafer used as a basis for the lens. It should be underlined that the device 100 can also propose to the individual 120 only the lenses that can be assembled in the frame that they have chosen.

In other terms, the method 200 of generating a final image is implemented in a method for augmented reality that comprises the steps of:

acquiring a video stream of the individual 120 who is positioned facing a camera 130 and displaying this video flow on the screen 150, with the video stream being processed by the method 200 of determining a final image, with the video stream displaying the individual 120 wearing on their face 121 a virtual frame 110 that was chosen beforehand;

modification by the individual 120 of an optical characteristic of at least one ophthalmic lens and updating in real time of the representation of the scene through one or several ophthalmic lenses, with the optical characteristic being included in the list:

correction of the sign of the individual, in particular of the diopter for near and/or far, or astigmatism;

centering parameters of the correction;

type of lens used, in particular of the material, of the transparency of the lens, of the tint of the lens or of the optical treatments applied, a. It should be underlined that the modification of an optical characteristic by the individual 120 can result in an automatic adaptation of the three-dimensional model of each lens, in particular on surfaces or contour that are assembled in the frame. In other terms, the machining parameters of each lens are, if necessary, updated automatically after each modification of an optical characteristic by the individual 120.

Other Advantages and Optional Characteristics of the Present Description

In alternative aspects of the present description, the method for augmented reality can also be used by an individual who is wearing on their face a real frame of a pair of spectacles. The image displayed on the screen then shows the individual wearing the real frame that comprises one or several ophthalmic lenses of which the characteristics were chosen by the individual. The individual can thus appreciate the wearing of the real frame which virtually comprises lenses and assess the final impact of the lenses, comprising in particular the optical deformations dues to one or several optical corrections applied.

In alternative aspects of the present description, the method of determining a final image is used on an image of an individual wearing a real pair of spectacles comprising corrective lenses. The individual indicates to the device implementing the method the optical correction for each lens that they wear. Knowing the optical correction of each lens, the calculating of the refraction by the method described in the sub-step 320 makes it possible to obtain a representation of the scene without optical deformation, by compensating the refraction visible on the initial image. It is then possible either to obtain a final image of the individual wearing the pair of spectacles wherein the lens virtually does not have any optical correction, or to obtain a final image of the individual wearing the same pair of spectacles but with a different correction.

What is claimed is:

1. A method for generating a final image of an individual from an initial image of the individual acquired by a real camera, the image being a still or contained in a video stream, recorded or in real time, said method comprising steps of:
   a) detecting a face of the individual in the initial image;
   b) realistically positioning a virtual frame on the face of the individual detected in the initial image, the frame comprising at least one ophthalmic lens characterized by an optical correction and/or an optical treatment;
   c) calculating a representation of a scene perceived from a virtual camera through the ophthalmic lens or lenses according to both a refraction of the ophthalmic lens or lenses and a depth map of the initial image, wherein calculation of the refraction is based at least partially on the depth map, the virtual camera representing the real camera in a virtual space;
   d) generating an overlay that is superimposed on the initial image, the overlay comprising the representation of the scene calculated in the step c);
   e) generating the final image by merging the overlay generated in step d) with the initial image.

2. The method according to claim 1, wherein the realistic positioning of a virtual frame on the face of the individual comprises the following sub-steps:
   determining real parameters of a position and an orientation of the face of the individual with respect to the real camera;
   representing the face of the individual in the virtual space by a virtual model (avatar) generated beforehand;
   positioning the avatar with respect to the virtual camera, the position and orientation of the avatar in the virtual space being calculated from the real parameters previously determined;
   realistic positioning of the virtual frame on the face of the avatar; and
   wherein the depth map combines the initial image with a depth map calculated from positioning parameters of the avatar.

3. The method according to claim 1, wherein the calculating of the representation of the scene also comprises sub-steps of:

calculating a rendering of a reflection of the lenses;
calculating a rendering according to a transparency of the lenses.

4. The method according to claim 1, wherein the overlay also comprises a projection of all or a part of the virtual frame.

5. The method according to claim 1, wherein the ophthalmic lens is represented by a three-dimensional model that has two opposite curved surfaces, spaced and configured according to the optical correction.

6. The method according to claim 1, wherein the lens is represented locally by a prism formed by two flat diopters.

7. The method according to claim 1, wherein the step of calculating a rendering of the ophthalmic lens implements a method of ray tracing and/or a method of rasterization.

8. The method according to claim 1, wherein a surface of the ophthalmic lens is associated with reflectance and refraction parameters.

9. The method according to claim 1, wherein a material of the ophthalmic lens is associated with at least one absorption coefficient according to a wavelength.

10. The method according to claim 9, wherein the material of the ophthalmic lens is associated with three absorption coefficients according to a translucency of the lens.

11. The method according to claim 1, wherein the optical treatment is included in the list:
   anti-reflective treatment;
   iridescence; and
   photochromic treatment.

12. The method according to claim 1, wherein the ophthalmic lens comprises the optical correction adapted to an eyesight of the individual.

13. The method according to claim 12, wherein a form of a three-dimensional model of the lens is representative of a machining associated with the optical correction and of a material used.

14. The method according to claim 13, also comprising a step of determining a centering parameter of a basic wafer in which the lens is machined.

15. The method according to claim 1, wherein the initial image is an image of an individual who is wearing a real pair of spectacles, with the individual having indicated the optical correction of each lens assembled in said pair of spectacles, a calculation of the refraction generates a representation of the scene perceived by the real camera through the lenses without optical deformation or with another optical correction.

16. A method for augmented reality used by an individual, comprising steps of:
   acquiring a video stream of the individual positioned facing a camera and displaying of this video stream on a screen, with the video stream being processed by the method for determining a final image according to claim 1, the video stream displaying the individual wearing on their face either a real frame worn by the individual or a virtual frame chosen beforehand;
   modification by the individual of one optical characteristic of at least one ophthalmic lens and updating in real time of the representation of the scene through one or several ophthalmic lenses, with the optical characteristic being included in the list:
   correction of the eyesight of the individual;
   centering parameters of the correction; and
   type of lens used.

17. A method for manufacturing a lens implementing the steps of the method for generating a final image according to claim 14, wherein machining parameters for the basic wafer used as a basis for the lens are established from the centering parameter determined beforehand.

* * * * *